US008159769B2

United States Patent
Batra et al.

(10) Patent No.: US 8,159,769 B2
(45) Date of Patent: *Apr. 17, 2012

(54) HEAT-ASSISTED MAGNETIC RECORDING WITH SHAPED MAGNETIC AND THERMAL FIELDS TO MINIMIZE TRANSITION CURVATURE

(75) Inventors: Sharat Batra, Plymouth, MN (US); Amit Vasant Itagi, Seven Fields, PA (US); Ganping Ju, Sewickley, PA (US); Xuhui Jin, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/107,722

(22) Filed: May 13, 2011

(65) Prior Publication Data

US 2011/0211428 A1    Sep. 1, 2011

Related U.S. Application Data

(63) Continuation of application No. 12/274,992, filed on Nov. 20, 2008, now Pat. No. 7,965,464.

(51) Int. Cl.
*G11B 5/02* (2006.01)
(52) U.S. Cl. .............. 360/59; 369/13.01; 369/13.33; 360/55

(58) Field of Classification Search ............... None
See application file for complete search history.

(56) References Cited

U.S. PATENT DOCUMENTS

| | | | |
|---|---|---|---|
| 6,795,630 | B2 | 9/2004 | Challener et al. |
| 7,155,732 | B2 | 12/2006 | Rausch et al. |
| 7,167,340 | B2 | 1/2007 | Sato et al. |
| 7,245,562 | B2 | 7/2007 | Ruigrok |
| 7,298,587 | B2 | 11/2007 | Pokhil et al. |
| 7,330,404 | B2 | 2/2008 | Peng et al. |
| 7,412,143 | B2 | 8/2008 | Rottmayer et al. |
| 7,742,368 | B2 | 6/2010 | Lee et al. |
| 7,876,646 | B2 * | 1/2011 | Tanaka et al. ............ 369/13.02 |
| 2006/0154110 | A1 | 7/2006 | Hohlfeld et al. |
| 2008/0158709 | A1 | 7/2008 | Tanaka et al. |
| 2008/0170319 | A1 | 7/2008 | Seigler et al. |
| 2008/0198738 | A1 | 8/2008 | Lu et al. |
| 2010/0123967 | A1 | 5/2010 | Batra et al. |

\* cited by examiner

*Primary Examiner* — Jason Olson
(74) *Attorney, Agent, or Firm* — Alan G. Rego; Westman, Champlin & Kelly, P.A.

(57) ABSTRACT

Devices and methods are provided for heat-assisted magnetic recording (HAMR). In an illustrative example, a device includes a magnetic write pole having a convex pole tip; a magnetic opposing pole longitudinally displaced from the magnetic write pole; and a thermal-source component disposed proximate to the magnetic write pole and comprising a laterally elongated thermal-source peg disposed proximate to the convex pole tip.

20 Claims, 6 Drawing Sheets

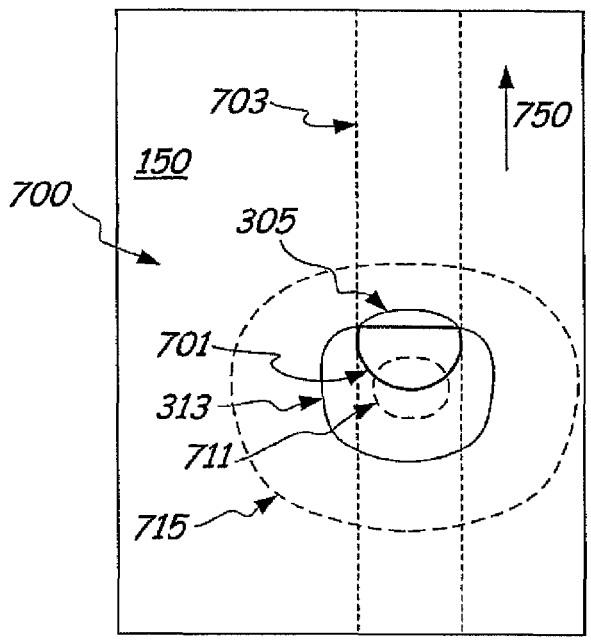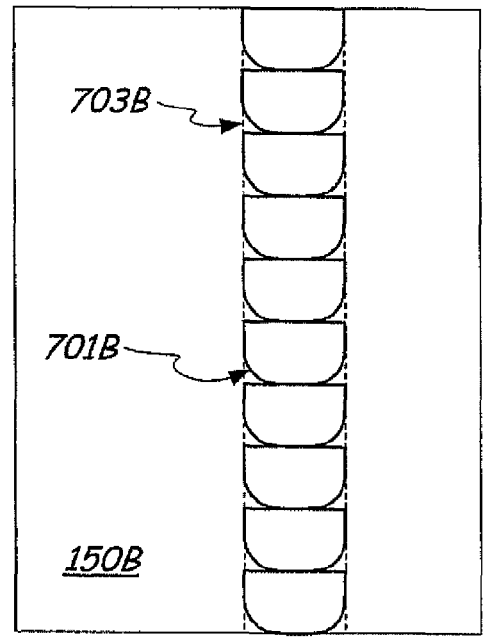
FIG. 8　　　　　FIG. 9
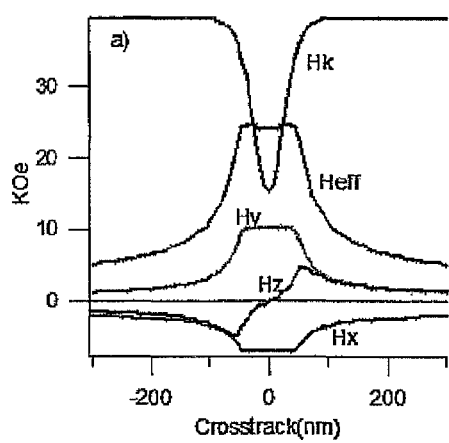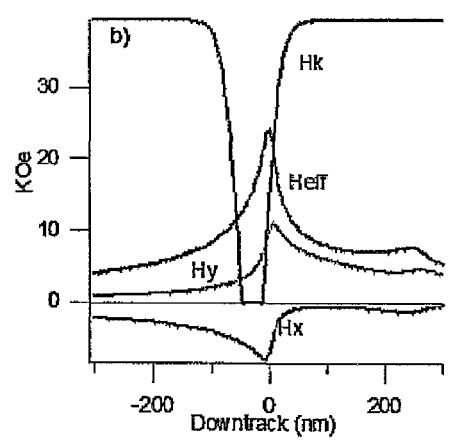
FIG. 10　　　　　FIG. 11

US 8,159,769 B2

HEAT-ASSISTED MAGNETIC RECORDING WITH SHAPED MAGNETIC AND THERMAL FIELDS TO MINIMIZE TRANSITION CURVATURE

REFERENCE TO RELATED APPLICATION

This application is a continuation of and claims priority from U.S. application Ser. No. 12/274,992, filed on Nov. 20, 2008, with a title of HEAT-ASSISTED MAGNETIC RECORDING WITH SHAPED MAGNETIC AND THERMAL FIELDS TO MINIMIZE TRANSITION CURVATURE.

FIELD OF THE DISCLOSURE

The present disclosure relates to heat-assisted magnetic recording.

SUMMARY

Devices and methods are provided for heat-assisted magnetic recording (HAMR). In an illustrative example, a device includes a magnetic write pole having a convex pole tip; a magnetic opposing pole longitudinally displaced from the magnetic write pole; and a thermal-source component disposed proximate to the magnetic write pole and comprising a laterally elongated thermal-source peg disposed proximate to the convex pole tip.

The features described above are illustrative only rather and do not define limitations on various embodiments. Other features and benefits that characterize various embodiments will be apparent from the following detailed description, the associated drawings, and the other disclosure herein.

BRIEF DESCRIPTION OF THE DRAWINGS

FIG. 8 depicts a plan view of intersecting thermal and magnetic fields on a magnetic recording medium, in accordance with an illustrative embodiment.

FIG. 9 depicts a plan view of a data track written by heat-assisted magnetic recording on a magnetic recording medium, in accordance with an illustrative embodiment.

FIG. 10 depicts a cross-track graph of a coinciding magnetic field and heat-induced reduction of magnetic coercivity in a magnetic recording medium, in accordance with an illustrative embodiment.

FIG. 11 depicts a down-track graph of a coinciding magnetic field and heat-induced reduction of magnetic coercivity in a magnetic recording medium, in accordance with an illustrative embodiment.

DETAILED DESCRIPTION

Figure 1:
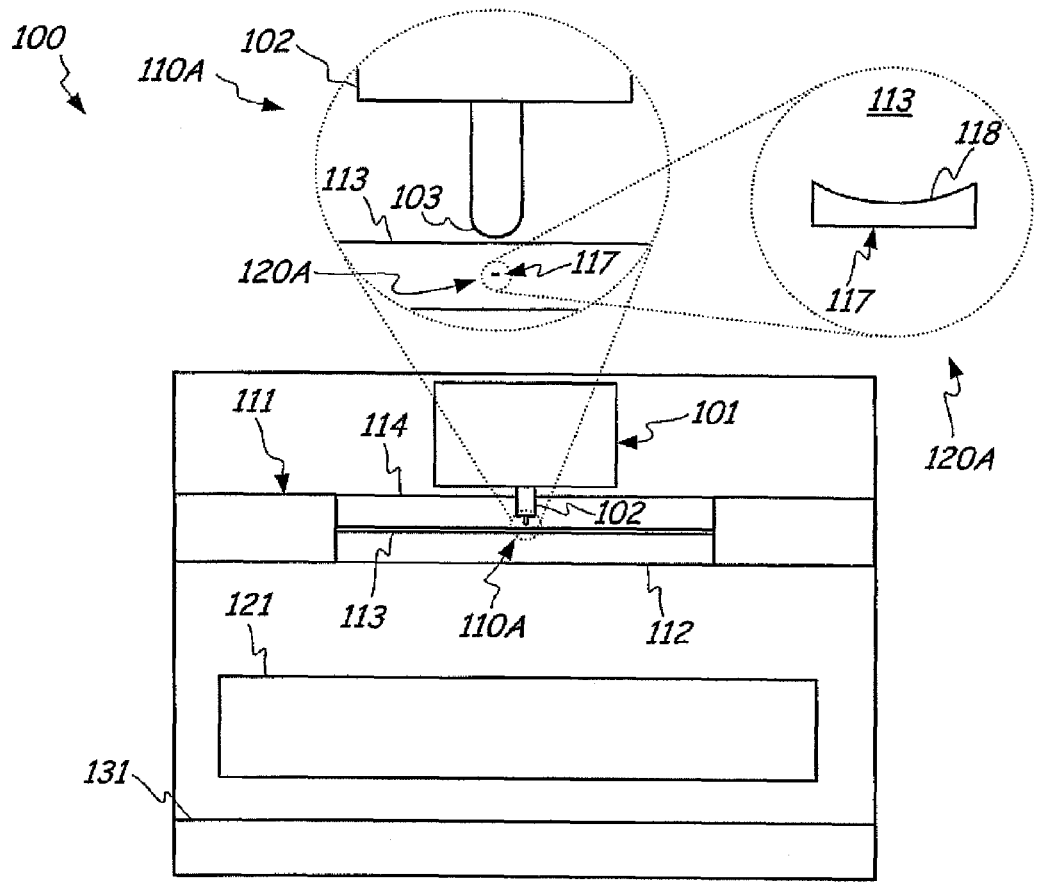
FIG. 1 depicts a plan view of a heat-assisted magnetic recording head, including exploded detail views, in accordance with an illustrative embodiment.

FIG. 1 depicts a top plan view of heat-assisted magnetic recording head 100, including an exploded plan view of section detail of area 110A of magnetic recording head 100, in accordance with an illustrative embodiment. Magnetic recording head 100 may be used for writing and reading data stored on a magnetic medium, including writing data using heat-assisted magnetic recording with shaped transition curvature, such as in disc drives and other data storage devices, for example. Magnetic recording head 100 includes magnetic write pole 101, magnetic opposing pole 121, solid immersion mirror 111, and reader 131. Solid immersion mirror 111 functions as a thermal-source component and includes a solid immersion mirror core 113 and solid immersion mirror cladding layers 112, 114. As can better be seen in the exploded view section details of areas 110A and 120A, magnetic write pole 101 includes pole neck 102 and convex magnetic pole tip 103, and a near field transducer peg 117 is disposed at a distal position on solid immersion mirror core 113, proximate to the convex magnetic pole tip 103. These features are illustrated in different perspectives and views in FIGS. 2-5.

Figure 2:
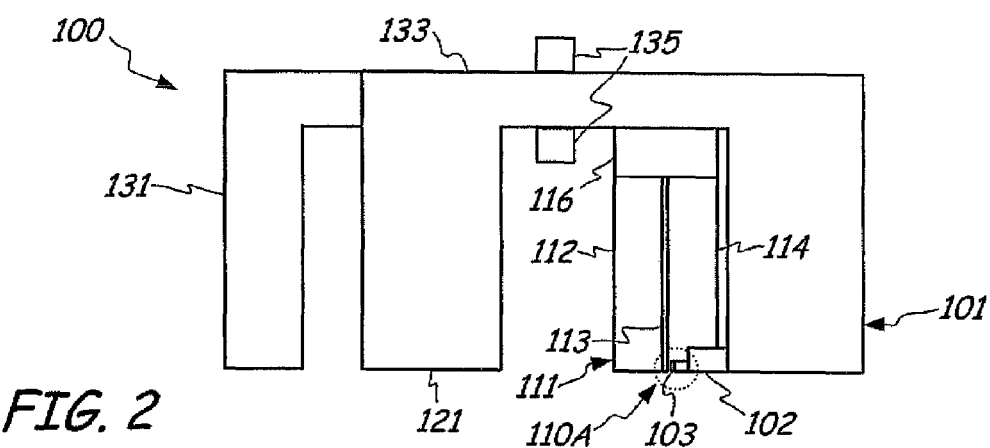
FIG. 2 depicts a side view of a heat-assisted magnetic recording head, in accordance with an illustrative embodiment.
Figure 3:
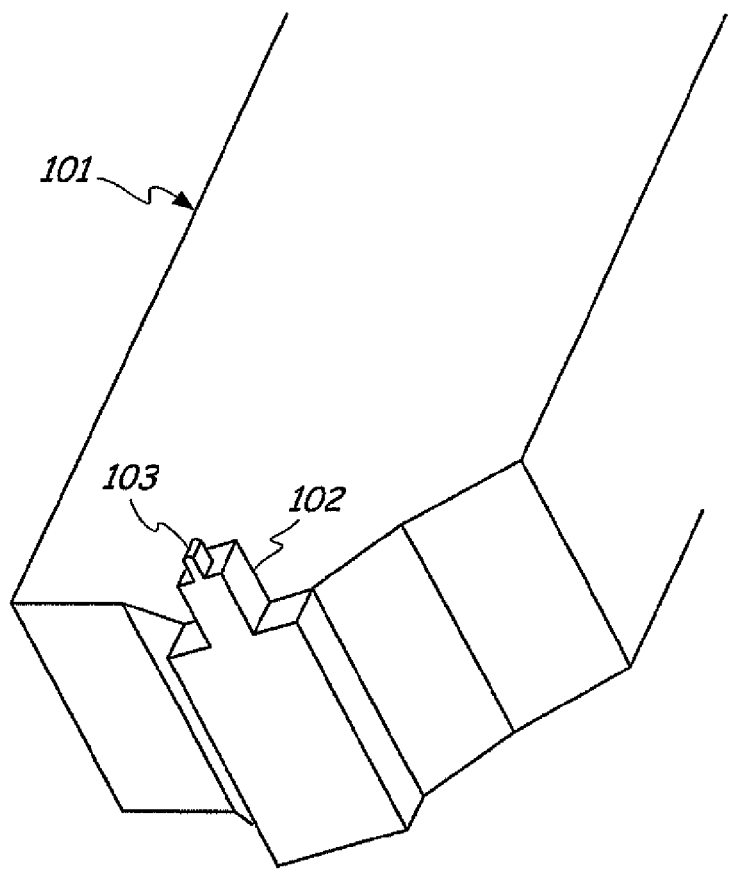
FIG. 3 depicts a perspective view of a magnetic write pole of a heat-assisted magnetic recording head, in accordance with an illustrative embodiment.

FIG. 2 depicts a side view of heat-assisted magnetic recording head 100, including section detail area 110A, in accordance with the same illustrative embodiment featured in FIG. 1. Magnetic write pole 101 and magnetic opposing pole 121 are connected by yoke 133, which is surrounded by inductive coil 135, in this illustrative embodiment. Magnetic write pole 101 and magnetic opposing pole 121 are configured for controllably providing a selectably directed magnetic field between them. Reader 131 is positioned a short distance from magnetic opposing pole 121, and may include various components that are not depicted here. FIG. 3 depicts a perspective view of magnetic write pole 101 of heat-assisted magnetic recording head 100, including pole neck 102 and convex magnetic pole tip 103, in accordance with the illustrative embodiment of FIGS. 1 and 2. Solid immersion mirror 111, including solid immersion mirror core 113, is disposed proximate to magnetic write pole 101, and may be disposed adjacent to an optical source 116 that either redirects or generates an optical beam that is transmitted through solid immersion mirror 111.

Figure 4:
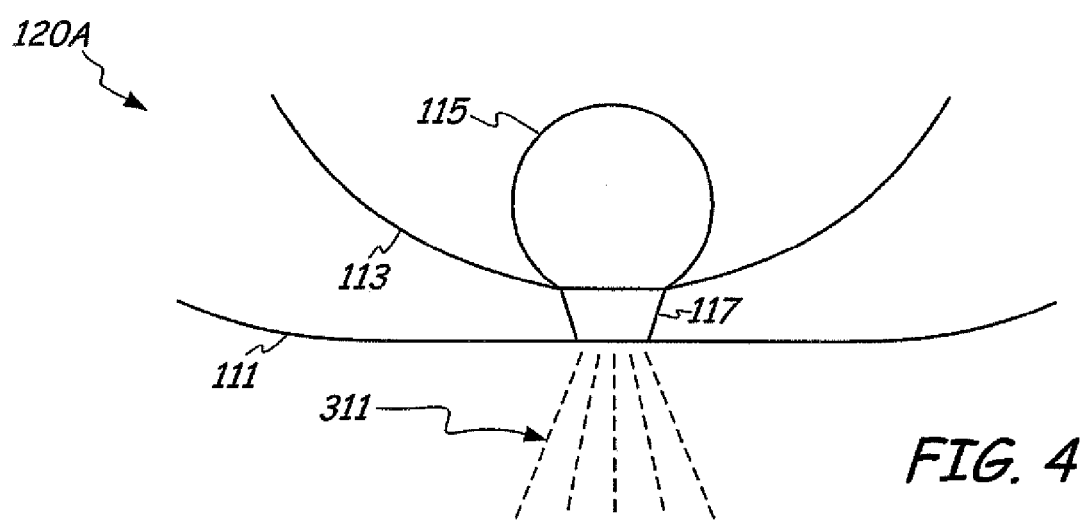
FIG. 4 depicts a cross-section forward view of a section detail of a thermal-source component of a heat-assisted magnetic recording head, in accordance with an illustrative embodiment.

The exploded view section detail of area 120A of solid immersion mirror 111 of the embodiment of FIGS. 1 and 2 is also depicted in FIG. 4 in a cutaway, detail, forward view, orthogonal to both the top plan view of FIG. 1 and the side plan view of FIG. 2. FIG. 4 shows a detailed section of solid immersion mirror 111 and solid immersion mirror core 113 with near field transducer disc 115 and near field transducer peg 117. Solid immersion mirror 111 may act as a waveguide that concentrates an optical beam at the position of near field transducer disc 115 and near field transducer peg 117, such that near field transducer peg 117 emits a resulting optical beam 311 in a highly concentrated and tightly localized area, which may, for example, be on the order of tens of nanometers across in this illustrative embodiment. As seen in FIG. 1 and FIG. 4, the near field transducer peg 117 is elongated laterally, where "lateral" refers to the side-to-side orientation relative to the magnetic recording head 100, i.e. the dimension depicted in the left-right orientation in FIGS. 1 and 4, and corresponding to a cross-track orientation. Near field transducer peg 117 is also disposed proximate to convex pole tip 103 of magnetic write pole 101. Near field transducer peg 117 also comprises a concave portion at a trailing edge 118 thereof in the illustrative embodiment of FIGS. 1-5, such that the concave portion of near field transducer peg 117 is disposed proximate to and facing convex pole tip 103 of magnetic write pole 101, as seen in detail area 120A of FIG. 1. The concave trailing edge 118 of near field transducer peg 117 and facing convex pole tip 103 of magnetic write pole 101 contribute to shaping the transition curvature involved in, and thereby enhancing the capability of, the heat-assisted magnetic recording of magnetic recording head 100, as is elaborated below. Solid immersion mirror 111, solid immersion mirror core 113, near field transducer disc 115, and near field transducer peg 117 are involved in providing a source of thermal energy, and together constitute a thermal-source component, in which near field transducer peg 117 constitutes a thermal-source peg. Solid immersion mirror 111 may be connected to an optical source 116, such as a laser diode or other suitable laser source, or a conduit, such as a grating coupling or tapered waveguide, to guide an optical beam from a separate source, for example. Solid immersion mirror 111 may serve as a planar waveguide to propagate the electromagnetic radiation from its source, through solid immersion mirror core 113, to near field transducer disc 115 and near field transducer peg 117, to result in electromagnetic radiation 311 emitted from near field transducer peg 117. The electromagnetic radiation used may be of ultraviolet, visible, infrared, or any applicable frequency. Solid immersion mirror 111 may be composed of a high refractive index dielectric material such as titanium oxides, tantalum oxides, silicon oxides, silicon, silicon nitrogen compounds, zinc sulfide, or other compounds including silicon, titanium, oxide, nitride, or sulfide, as illustrative examples. Solid immersion mirror 111 serves as a waveguide to concentrate the electromagnetic radiation from its source to near field transducer peg 117. Near field transducer peg 117 may be composed of a highly conductive substance such as gold, silver, copper, aluminum, or a combination of one or more of those or other metals, in different illustrative examples. Near field transducer peg 117 may support a surface plasmon mode that further concentrates the electromagnetic energy from solid immersion mirror 111 to an intensely concentrated and spatially restricted spot on a proximate recording medium.

A wide variety of other embodiments of thermal-source components and thermal-source pegs may also be used in other embodiments. For example, a solid immersion lens or a mode-index lens may also be used instead of a solid immersion mirror, in different embodiments. Solid immersion mirror 111, solid immersion mirror core 113, near field transducer disc 115, and near field transducer peg 117 contribute to enabling magnetic recording head 100 to implement heat-assisted magnetic recording with shaped transition curvature, to enhance the capability of the magnetic recording head 101 to record data with a combination of high areal density and high reliability. The shaped transition curvature of the area in which a magnetic bit is written into a magnetic medium involves both the curvature of the magnetic write field and the curvature of the thermal field provided by the magnetic recording head 101, and is further elaborated below.

Figure 5:
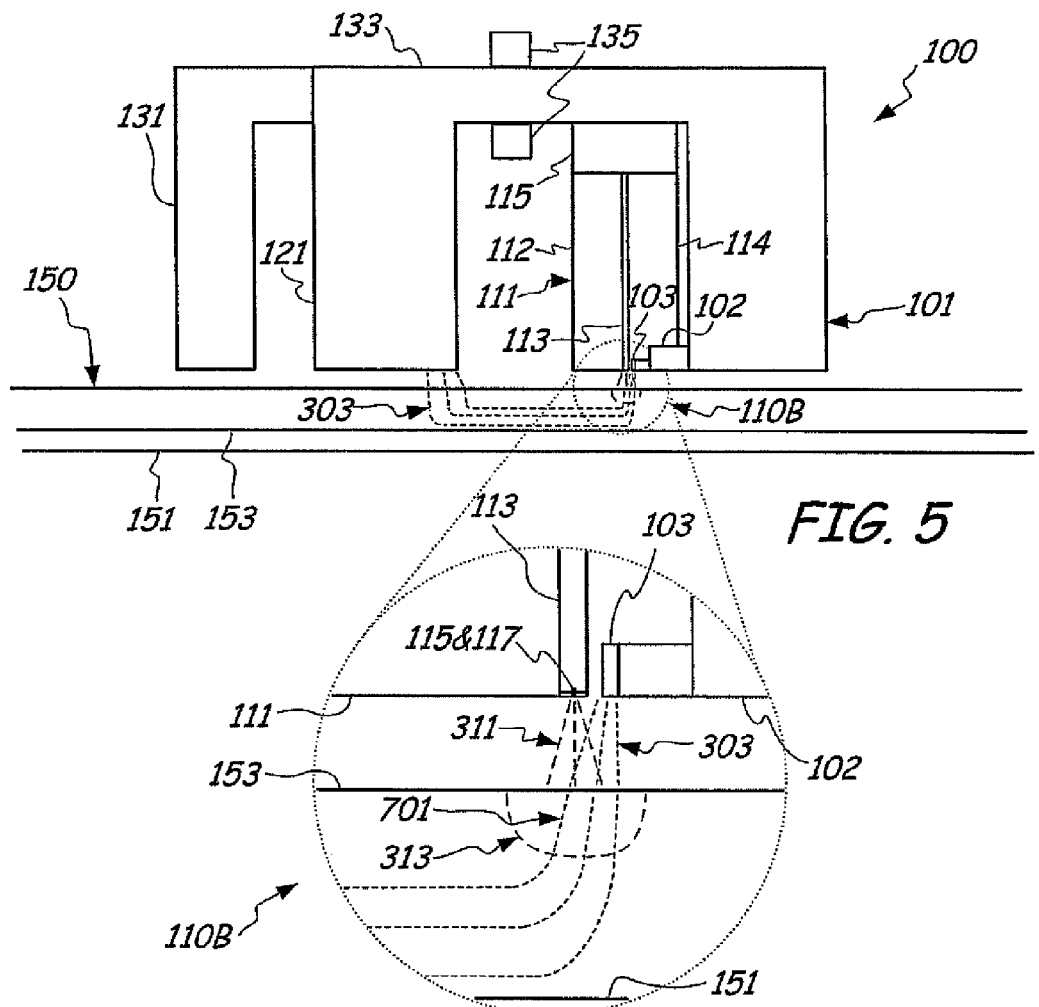
FIG. 5 depicts a side view of a heat-assisted magnetic recording head and a magnetic recording medium, including an exploded detail view, in accordance with an illustrative embodiment.

FIG. 5 depicts a side view of heat-assisted magnetic recording head 100 in accordance with the illustrative embodiment of FIGS. 1 and 2, and positioned in proximity to magnetic recording medium 150, in accordance with an illustrative embodiment. FIG. 5 also depicts an exploded detail side view of area 110B of magnetic recording head 101 and magnetic recording medium 150. Magnetic recording head 101 may be positioned proximate to magnetic recording medium 150 by various means, which are further discussed below. FIG. 4 depicts solid immersion mirror 111 in the process of emitting optical energy for heat-assisted magnetic recording, and FIG. 5 depicts magnetic recording head 101 in the process of performing heat-assisted magnetic recording on magnetic recording medium 150. The components of magnetic recording head 101 are the same in FIG. 5 as in FIGS. 1-4, and with the same reference labels, including magnetic write pole 101, magnetic opposing pole 121, yoke 133, inductive coil 135, solid immersion mirror 111, solid immersion mirror core 113, near field transducer disc 115, and near field transducer peg 117.

Magnetic recording medium 150 includes substrate layer 151 and hard magnetic layer 153 disposed on substrate 151, in the present illustrative embodiment. A wide variety of other embodiments of a magnetic recording medium may also be used that include other and/or additional layers or other components, illustrative examples of which may include a soft magnetic layer, an insulating layer, a heat sink layer, or a laminate layer, and so forth. For example, the magnetic recording medium 150 may also include a heat sink layer disposed on substrate layer 151, a thermal barrier layer disposed on the heat sink layer, the hard magnetic layer 153 disposed on the thermal barrier layer, a dielectric layer disposed on the hard magnetic layer 153, an overcoat layer disposed on the dielectric layer, and a lubricating layer disposed on the overcoat layer, for example. In another embodiment, a soft magnetic layer may be disposed between the substrate 151 and the hard magnetic layer 153, as another illustrative example. Hard magnetic layer 153 may be formed of a hard magnet, i.e. a magnet having a relatively high coercivity. For example, the hard magnetic layer may be composed of cobalt platinum (CoPt), cobalt chromium platinum (CoCrPt), iron platinum (FePt), cobalt palladium (CoPd), iron palladium (FePd), other alloys containing two or more of cobalt, iron, nickel, niobium, tin, chromium, platinum, palladium, neodymium, samarium, or analogous metals, or other materials having high magnetic anisotropy or otherwise having high coercivity. The substrate 151 may be composed of glass or silicon, as illustrative examples. As examples for a soft magnetic layer, if one is used, it may be composed of one or more of iron, cobalt, boron, aluminum, nitrogen, silicon, zirconium, niobium, or tantalum, for example, or other materials, such that the coercivity is less than that of hard magnetic layer 153. If they are used, the heat sink layer may be composed of gold, copper, or similar materials, as illustrative examples; the thermal barrier layer may be composed of silica, zirconia, tantalum oxide, or similar materials, as illustrative examples; and the overcoat layer may be composed of diamond-like carbon (DLC), or similar materials, as illustrative examples. Magnetic recording head 100 and magnetic recording medium 150 may be configured for perpendicular recording using giant magnetoresistance (GMR), tunneling magnetoresistance (TMR), or any other flux-sensing configuration, in this embodiment. Other embodiments may involve inductive magnetoresistance recording, magneto-optical recording, microwave-assisted magnetic recording, or other types of recording data on a medium.

FIG. 5 depicts magnetic recording head 101 in the process of recording data on magnetic recording medium 150 using heat-assisted magnetic recording. As depicted in FIG. 5, and particularly in the exploded section detail of area 110B, near field transducer peg 117 at the distal end of solid immersion mirror core 113 is emitting electromagnetic radiation 311 onto magnetic recording medium 150, giving rise to a thermal spot 313, i.e. a heated section of hard magnetic layer 153. The thermal energy of electromagnetic radiation 311 temporarily reduces the magnetic coercivity of the heated section of hard magnetic layer 153 at thermal spot 313. At approximately the same time, magnetic recording head 100 is energized to generate a magnetic field 303 based on a data pattern to be written, and generates the magnetic field 303 between the convex magnetic write pole 103 and the magnetic opposing pole 121. In the vicinity of magnetic write pole 103, magnetic field 303, a portion of the magnetic field extending between convex magnetic write pole 103 and the magnetic opposing pole 121, extends through hard magnetic layer 153 approximately perpendicular to the surface of hard magnetic layer 153, and with substantial overlap with thermal spot 313. Magnetic field 303 (or a substantial portion thereof) then extends through hard magnetic layer 153 to opposing magnetic pole 121.

The coercivity of hard magnetic layer 153 may be high enough such that the magnetization of hard magnetic layer 153 is not altered by magnetic field 303 except within thermal spot 313, because the coercivity there has been temporarily reduced by elevated temperature induced by electromagnetic radiation 311. Within a magnetic bit 701 defined by a given area of overlap between thermal spot 313 and magnetic field 303 within hard magnetic layer 153, both the temperature of thermal spot 313 and the magnetic field strength of magnetic field 303 may be high enough that magnetic field 303 is enabled to switch the magnetization of the section of hard magnetic layer 153 within that magnetic bit 701. That magnetization may be controllably directed to write either an up or down magnetic bit, for the magnetic recording of the present embodiment.

Magnetic bit 701 may therefore be written to, i.e. have its magnetization selectably, reliably, and permanently changed between either up or down, by the process of heat-assisted magnetic recording as illustratively depicted in FIG. 3. Magnetic bit 701 is smaller than a magnetic bit that may be written on an otherwise analogous magnetic medium having a low enough coercivity to be written to with a magnetic field alone, without heat-assisted magnetic recording. For a magnetic bit to be written reliably, it must have a high enough product of size and coercivity to resist being randomly re-magnetized by random thermal fluctuations. The stability of the magnetization of a magnetic bit against thermal disturbances can be modeled as a threshold value of $K_u V/kT$, where $K_u$ is magnetic anisotropy energy density, V is the volume of a magnetic grain, k is Boltzmann's constant, and T is temperature, where a magnetic bit may include several magnetic grains. In an illustrative embodiment, a value for $K_u V/kT$ of at least approximately 60 (with no units, because x is a dimensionless ratio) is used as a design standard for maintaining the magnetization of a magnetic bit. Therefore, for a magnetic layer of a given magnetic anisotropy energy density, there is a minimum size for which a stable magnetic bit can be written, where smaller magnetic bits would have an unacceptably substantial susceptibility to random loss of the written magnetization.

Smaller magnetic bit size, and higher density of data, can instead be achieved by using a magnetic layer with a higher coercivity, even a coercivity that is too high to write to with a magnetic field alone, i.e. without heat-assisted recording, from available magnetic write poles. The heat-assisted magnetic recording as disclosed herein makes it possible to write reliable magnetic bits in a hard magnetic layer of such high coercivity. As an example, in the illustrative embodiment, hard magnetic layer 153 may have a coercivity of between approximately 25 and 100 kilooersteds in various embodiments, and may illustratively have a coercivity of about 80 kilooersteds in the present example. The magnetic write pole 103 may provide a saturation magnetization ($4\pi m_s$) of greater than 1.6 tesla, and in particular approximately 2.4 tesla in this illustrative example. The corresponding magnetic bit size may be on the order of approximately 5 nanometers across, as an illustrative example, and may be from approximately 10 nanometers to approximately 1 nanometer across in each of the down-track and cross-track directions, in various illustrative embodiments. In various embodiments the hard magnetic layer may also have other values of coercivity $H_k$ from about 40 kilooersteds to well over 80 kilooersteds (where $H_k$ is equal to $2K_u/m_s$). The heat-assisted magnetic recording of the present embodiment temporarily lowers the coercivity of the area of hard magnetic layer 153 within the overlap of the thermal spot 313 and magnetic field 303 to enable magnetization of a magnetic bit 701, which then returns to the higher coercivity once the heat of the write process disperses, which it does very quickly, leaving magnetic bit 701 with a stable value for $K_u V/kT$ of at least approximately 60. The heat-assisted magnetic recording of the present embodiment therefore makes possible smaller magnetic bits and higher data density than would be possible without heat-assisted magnetic recording. The present embodiment also successfully addresses additional issues involved with heat-assisted magnetic recording on the small scales involved, including written magnetic bit transition curvature.

Written magnetic bit transition curvature depends on both the transition curvature of magnetic field 303 and the transition curvature of thermal spot 313. In both cases, the transition curvature involves how rounded the edges of the effective area of the fields are, on the hard magnetic layer 153. For the high data density, small magnetic bit size, and small feature size of the present embodiment, it becomes a challenge to minimize the transition curvature. Relatively high transition curvature also leads to a broader full width at half-maximum (FWHM) and loss of signal-to-noise ratio of the write signal, and relatively high jitter or uncertainty in the magnetization of the edges of a magnetic bit. Minimizing transition curvature is a particular problem for the thermal energy induced by the electromagnetic radiation of a near field transducer peg, because on the applicable small scale of the electromagnetic emission, the optical spot of its intersection with the magnetic recording medium 150 tends to be generally circular, and the effective thermal spot induced by the optical energy has a still greater tendency than the optical spot toward being circular, due to the thermal energy within the thermal spot 313 diffusing from the area of incidence of the optical energy or electromagnetic radiation 311 on the magnetic recording medium 150. This elevated transition curvature would tend to lead to written magnetic bits with edges that are rounded rather than being straight, while the magnetic reader reads an area straight across, such that a rounded transition curvature leads to reduced resolution and reduced signal-to-noise ratio of the data read by the reader from the magnetic medium. This would also reduce available data density, because the rounded magnetic bit boundaries would also require greater spacing between adjacent magnetic bits to avoid erroneously reading from or writing over adjacent written magnetic bits.

These challenges are addressed by features of the present illustrative embodiment such as the convex, ellipsoidal, or curved magnetic write pole 103 and the laterally elongated near field transducer peg 117, for example. The convex curved magnetic pole tip 103, with curvature that may illustratively be approximately cylindrical or parabolic (or as seen in the perspective view of FIG. 3), is oriented in the forward longitudinal direction (i.e. downward in FIG. 1, leftward in FIGS. 2 and 5, and toward the upper left corner and out of the page in the perspective view of in FIG. 4). The convex curved magnetic pole tip 103 is positioned proximate to the near field transducer peg 117, and provides a stronger magnetic field 303 at the magnetic bit 701, due in part to its convex curvature, than an otherwise analogous rectilinear magnetic pole tip. Additionally, the convex curvature of magnetic pole tip 103 has a greater average distance from near field transducer peg 117, and therefore introduces less obscuration of the electromagnetic radiation 311, than an otherwise analogous but rectilinear magnetic pole tip, thereby improving optical efficiency of near field transducer peg 117 in delivering optical energy to the magnetic recording medium 150.

Figure 6:
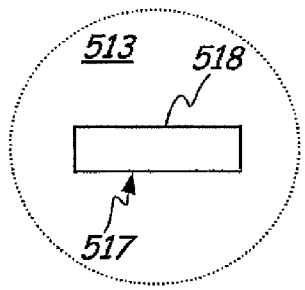
FIG. 6 depicts a plan view of a section detail of a thermal-source component of a heat-assisted magnetic recording head, in accordance with another illustrative embodiment.
Figure 7:
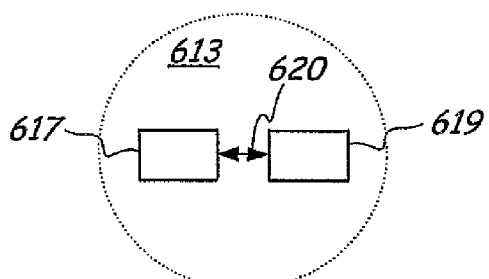
FIG. 7 depicts a plan view of a section detail of a thermal-source component of a heat-assisted magnetic recording head, in accordance with another illustrative embodiment.

For its part, the laterally elongated near field transducer peg 117 is wider in the cross-track direction than in the down-track direction, and provides the thermal spot 313 having narrower, sharper, better-defined transition curvature in a longitudinal or down-track direction, while the laterally displaced edges of thermal spot 313 contribute to the thermal efficiency of thermal spot 313 while promoting straight transition curvature along the elongated, cross-track direction. This is further discussed below with reference to FIG. 8. FIGS. 6 and 7 depict various illustrative configurations of laterally elongated near field transducer pegs in addition to illustrative near field transducer peg 117 of FIGS. 1-5.

FIG. 6 depicts a plan view of a section detail 120B of an illustrative heat-assisted magnetic recording head, and FIG. 7 depicts a plan view of a section detail 120C of an illustrative recording head, in accordance with other illustrative embodiments, otherwise analogous to the section detail of area 120A of heat-assisted magnetic recording head 100 of FIG. 1. Recording head section 120B includes near field transducer peg 517 disposed on solid immersion mirror core 513. Recording head section 610 includes coupled near field transducer nanorods 617 and 619 disposed on solid immersion mirror core 613. As with near field transducer peg 117, near field transducer peg 517 and near field transducer nanorods 617 and 619 may equivalently be considered to be or to be included in thermal-source pegs. The different thermal pegs as depicted in FIGS. 1-7 all help provide, in different ways, a relatively straight and narrow transition curvature for the thermal spot 313 and thereby also of magnetic bit 701. The particular effects provided by these different thermal pegs are illustrated in part by FIG. 8, which is discussed further below.

In magnetic recording head 100, near field transducer peg 117 is elongated laterally, i.e. elongated in the direction of left-right as seen in FIG. 1 and in the direction of left-right as seen in FIG. 4. Near field transducer peg 117 also comprises a concave surface 118 proximate to and facing the magnetic pole tip 103. This concave surface 118 serves to compensate for the tendency to curvature of the footprint of the thermal spot 313 along its edge corresponding to the concave surface 118, on the trailing edge of the thermal spot, and to straighten the transition curvature of the footprint of the thermal spot 313 where it overlaps with magnetic field 303. In particular, the thermal spot 313 has a footprint on the hard magnetic layer 153 defined by an isothermal profile forming the boundary of the section of hard magnetic layer 153 that is sufficiently heated to lower the coercivity to allow magnetization writing by the magnetic field 303, relative to the strength of that magnetic field. It is this isothermal profile that defines the boundary of thermal spot 313, where the intersection of sufficient strength of magnetic field 303 with thermal spot 313 defines the section of hard magnetic layer 153 that is magnetized in a write operation, thereby defining magnetic bit 701. This isothermal profile of thermal spot 313 and its intersection with the peak area of magnetic field 303 are further illustrated in FIGS. 10 and 11.

FIG. 10 depicts a cross-track graph of a coinciding magnetic field and heat-induced reduction of magnetic coercivity in a magnetic recording medium, in accordance with an illustrative embodiment. FIG. 11 depicts a down-track graph of a coinciding magnetic field and heat-induced reduction of magnetic coercivity in a magnetic recording medium, in accordance with an illustrative embodiment. In both of FIGS. 10 and 11, the upper curve is labeled $H_k$ for the temporary coercivity of the hard magnetic layer 153 within the thermal spot 313, while the next lower curve is labeled $H_{\it{eff}}$ for the total magnetic field 303 in the same area. The other curves depict magnetic field components. The coercivity is reduced in positions corresponding to the temperature being increased. In both FIGS. 10 and 11, the overlap where the magnetic field is higher than the coercivity corresponds to the area of overlap defining magnetic bit 701 on the hard magnetic layer 153 in FIG. 8, where the peak magnetic field 305 intercepts the peak thermal spot 313 where the magnetic field is sufficiently high and the coercivity sufficiently lowered for the magnetization to be controllably overwritten. As can be seen also in FIG. 11, the magnetic field is at its strongest near the trailing edge of thermal spot 313, where thermal spot 313 is straightest, and drops off very rapidly on the other side of that trailing edge, enhancing the sharply delineated curvature transition of the magnetic bit 701.

In the illustrative example of the near field transducer peg 117 of FIGS. 1-5, the concave surface 118 compensates for the curvature of the thermal spot 313 relative to the footprint of the electromagnetic radiation 311, and helps provide an isothermal profile of the heated portion such that its trailing edge, relative to the motion of the magnetic recording medium 150, is relatively straight, at least relative to the rest of the isothermal profile, as seen in the trailing edge (toward the top of the page as seen in FIG. 8) of thermal spot 313 and the coincident trailing edge of magnetic bit 701.

In contrast, near field transducer peg 517 of recording head section 510 of FIG. 6 comprises a flat surface 518 proximate to and facing the magnetic pole tip 503. Flat surface 518 may also provide a straight trailing edge to the thermal footprint on a magnetic recording medium of energy emitted by near field transducer peg 517, in accordance with another illustrative embodiment.

In the illustrative embodiment of FIG. 7, dual, laterally offset, near field transducer nanorods 617 and 619 are coupled at the end of the near field transducer, proximate to and facing the magnetic pole tip 603. Near field transducer nanorods 617 and 619 are separated by a rectangular dielectric gap 620, and provide electromagnetic radiation through a gap plasmon that propagates through the dielectric gap 620 defined between the coupled near field transducer nanorods 617 and 619, which provides another way of providing a straight isothermal profile for the trailing edge of the thermal spot generated on a magnetic recording medium, in accordance with this illustrative embodiment.

FIG. 8 depicts a plan view of the area of intersection 700 of thermal spot 313 and magnetic field 303 on magnetic recording medium 150, in accordance with an illustrative embodiment. Magnetic recording medium 150 is in rapid motion relative top the magnetic recording head 100, with that relative motion in the direction of the top of the page as seen in FIG. 8, as indicated with vector 750. While the boundary of thermal spot 313 is defined by an isothermal profile of the portion of the heated area that is hot enough to lower the coercivity to allow a new magnetization, the heated area is also characterized by illustrative additional isothermal profiles 711, 715, that indicate higher and lower temperatures, respectively, compared to that of isothermal profile 313. The area of overlap of thermal spot 313 and magnetic field 303 defines magnetic bit 701, as the section of hard magnetic layer 153 that has its coercivity sufficiently lowered to have its magnetization changed by magnetic field 303. As a magnetic recording head 100 is engaged in forward, i.e. down-track, motion relative to the magnetic recording medium 150, corresponding with the direction downward toward the bottom of the page in FIG. 8 (i.e. relative to the motion of magnetic recording medium 150 in the direction of vector 150), the magnetic field 303 may selectably be activated and inactivated, in either of two opposing magnetic polarizations each time, to sequentially write a series of magnetic bits by heat-assisted magnetic recording on hard magnetic layer 153 as it moves along, thereby defining a data track 703. FIG. 9 depicts a plan view of such a series of magnetic bits 701B written onto magnetic recording medium 150, such that together they form a data track 703B. Magnetic bits 701B are formed at a size smaller than what could be formed in a recording medium of lower coercivity, and at a fraction of the size of the footprint of either the magnetic field 303 or the thermal spot 313. Magnetic bits 701B are also formed in a relatively rectangularized shape with boundaries defined with enhanced transition curvature due to features such as elongated and shaped near field transducer pegs and convex magnetic pole tips, thereby achieving smaller magnetic bit size and higher data density than would be possible absent such features.

Figure 12:
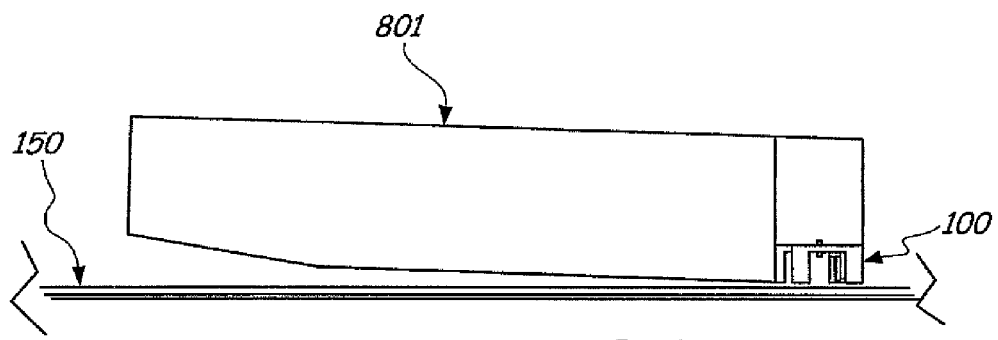
FIG. 12 depicts a side view of a slider that includes a heat-assisted magnetic recording head, in accordance with an illustrative embodiment.

FIG. 12 depicts a side view of a slider 801 that includes a heat-assisted magnetic recording head 100, in accordance with an illustrative embodiment. Slider 801 is positioned proximate to magnetic recording medium 150 such that heat-assisted magnetic recording head 100 is in close proximity to magnetic recording medium 150, such as in the tens or low hundreds of nanometers in an illustrative example, though other distances may also be involved in various embodiments, and the distance may vary within a range down to zero temporarily during the motion of slider 801. Slider 801 may be so positionable due to additional features of a data storage system such as the illustrative example of FIG. 13.

Figure 13:
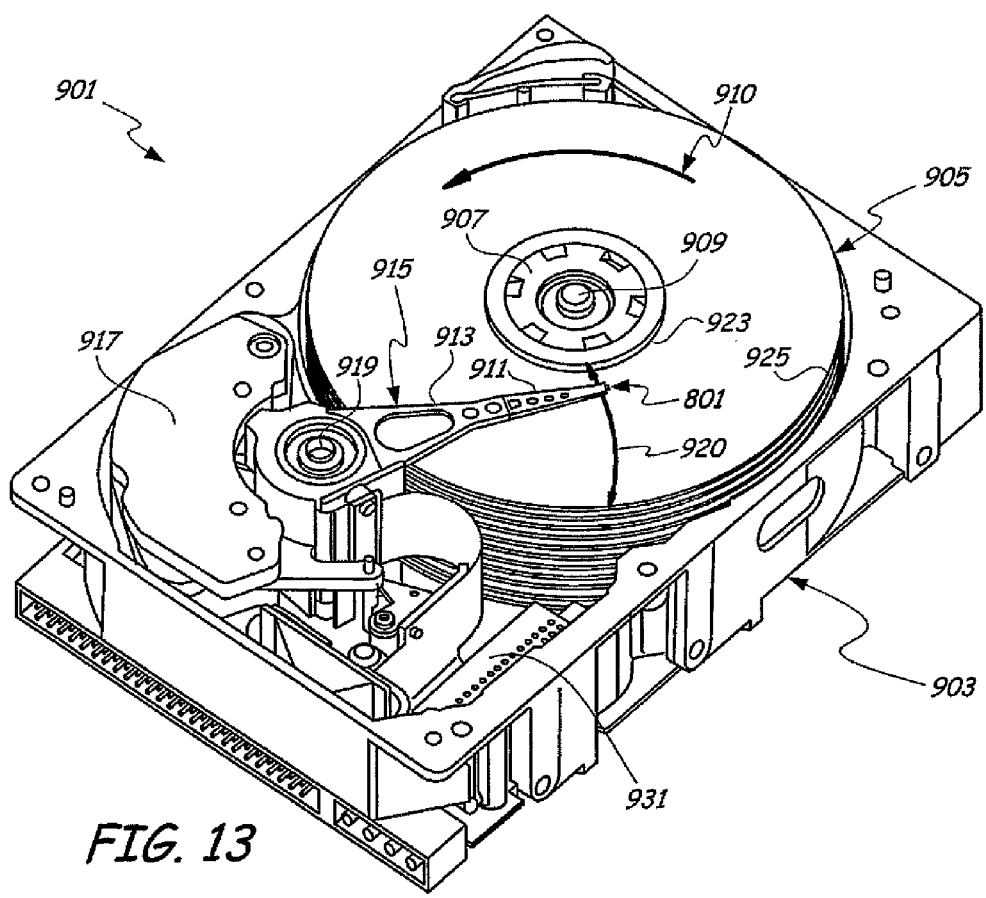
FIG. 13 depicts a perspective view of a data storage system that includes heat-assisted magnetic recording heads, in accordance with an illustrative embodiment.

FIG. 13 depicts a perspective view of an illustrative example of a data storage system 901 that includes heat-assisted magnetic recording heads, in accordance with an illustrative embodiment. Data storage system 901 includes a housing with a base 903 and a top cover (not shown). Data storage system 901 further includes a disc pack 905, which is mounted on a spindle motor (not shown) by a disc clamp 907. Disc pack 905 includes a plurality of individual discs, which are mounted for co-rotation in rotational direction 910 about central axis 909. Each disc surface has an associated slider 801 which is mounted to data storage system 901 for communication with the disc surface. Sliders 801 may each include heat-assisted magnetic recording heads such as the illustrative examples depicted and discussed herein. In the example shown in FIG. 13, sliders 801 are supported by suspensions 911 which are in turn attached to track accessing arms 913 of an actuator 915. The heat-assisted magnetic recording heads disposed on the sliders 801 may thereby be disposed on respective suspensions 911 and positionable thereby proximate to the hard magnetic layers of the discs in disc pack 905. The actuator shown in FIG. 13 is of the type known as a rotary moving coil actuator and includes a voice coil motor (VCM), shown generally at 917. Voice coil motor 917 rotates actuator 915 with its attached sliders 801 about a pivot shaft 919 to position sliders 801 over desired data tracks along an arcuate path 920 between a disc inner diameter 923 and a disc outer diameter 925. Voice coil motor 917 is driven by servo electronics 931 based on signals generated by sliders 801 and a host computer (not shown).

Figure 14:
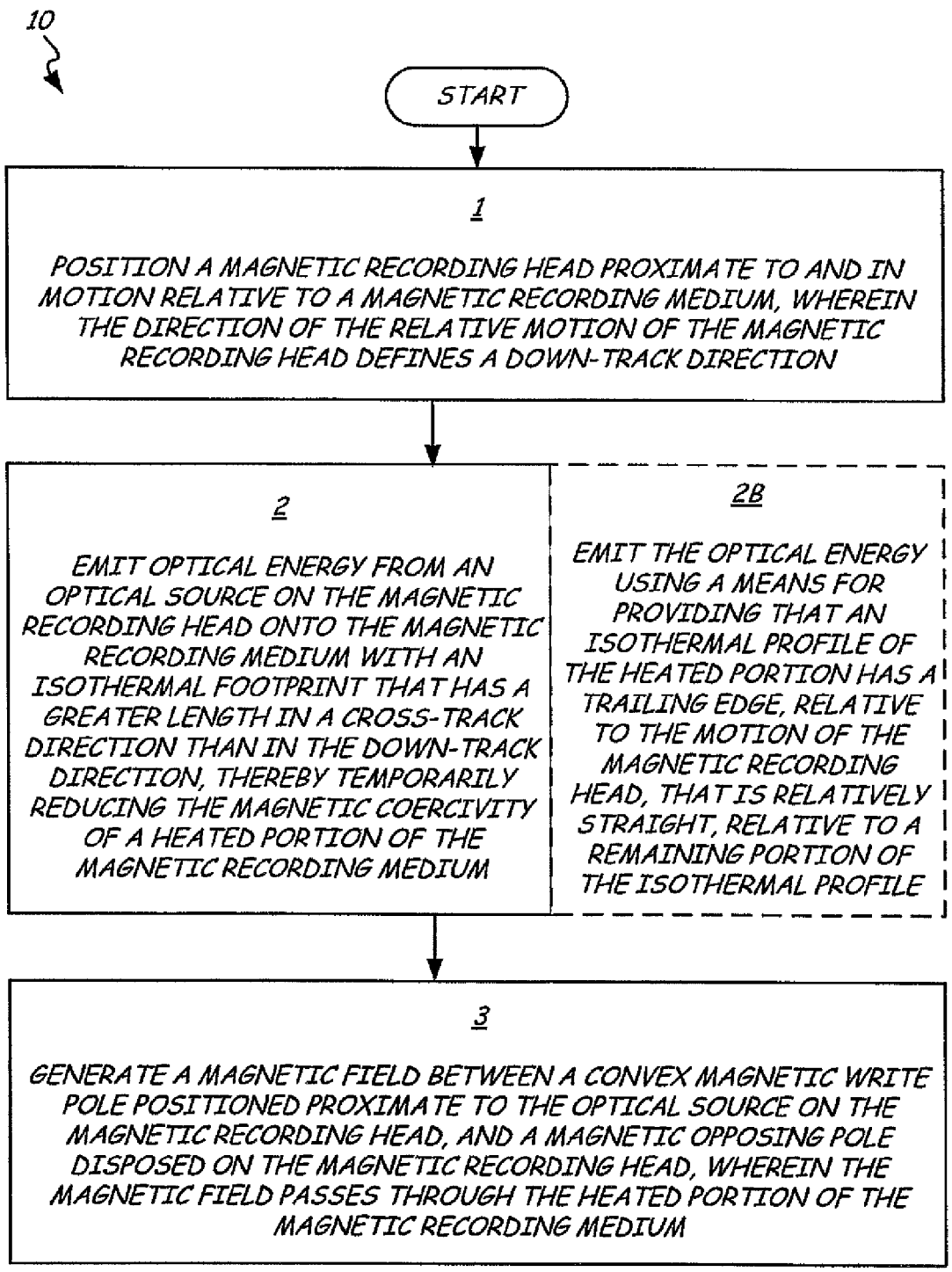
FIG. 14 depicts a flowchart for a process for heat-assisted magnetic recording, in accordance with an illustrative embodiment.

FIG. 14 depicts a flowchart for a process 10 for heat-assisted magnetic recording, in accordance with an illustrative embodiment largely along the lines of how heat-assisted magnetic recording may be performed with reference to the devices discussed for the previous figures. Process 10 includes step 1, of positioning a magnetic recording head proximate to and in motion relative to a magnetic recording medium, wherein the direction of the relative motion of the magnetic recording head defines a down-track direction; step 2, of emitting optical energy from an optical source on the magnetic recording head onto the magnetic recording medium with an isothermal footprint that has a greater length in a cross-track direction than in the down-track direction, thereby temporarily reducing the magnetic coercivity of a heated portion of the magnetic recording medium; and step 3, of generating a magnetic field between a convex magnetic write pole positioned proximate to the optical source on the magnetic recording head, and a magnetic opposing pole disposed on the magnetic recording head, wherein the magnetic field passes through the heated portion of the magnetic recording medium, according to an illustrative example of a process of heat-assisted magnetic recording. Step 2 of process 10 may also include step 2B, of emitting the optical energy using a means for providing that an isothermal profile of the heated portion has a trailing edge, relative to the motion of the magnetic recording head, that is relatively straight, relative to a remaining portion of the isothermal profile, in accordance with other illustrative embodiments. For example, the means for providing a straight isothermal profile of the heated portion may illustratively include the concave trailing edge surface 118 of near field transducer peg 117, the straight trailing edge surface 518 of near field transducer peg 517, or the near field transducer nanorods 617, 619 and the gap defined therebetween, as depicted in the prior figures and discussed above, along with various other embodiments.

The present disclosure therefore includes unexpected and novel advantages as detailed herein and as can be further appreciated from the claims, figures, and description by those skilled in the relevant art. Although some of the embodiments are described in reference to a data storage medium or a data storage system, or to even more particular embodiments such as a disc or a disc drive, the present disclosure encompasses various other embodiments with application to other data storage technologies and a wide variety of other types of devices. Additionally, it is understood that references to a read head or a head may be illustrative examples of a read and/or write head of any type. As another example, any other type of thermal sources or thermal-source pegs may also be used to provide directed thermal energy for heat-assisted magnetic recording, and are not restricted to specific examples discussed above such as those specifically involving near field transducer components or solid immersion lenses or mirrors, for example. A wide array of variations for the magnetic write poles may also be involved, besides the specific illustrative examples and structures discussed above. In addition, a wide variety of different magnetic recording media may be used in various embodiments, including those that involve perpendicular media, longitudinal media, tilted media, patterned media, or other recording media.

It is to be understood that even though numerous characteristics and advantages of various illustrative embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure, to the full extent indicated by the broad, general meaning of the terms in which the appended claims are expressed. It will be appreciated by those skilled in the art that the teachings of the present disclosure can be applied to a family of systems, devices, and means encompassed by and equivalent to the examples of embodiments described, without departing from the scope and spirit of the present disclosure. Further, still other applications for various embodiments, including embodiments pertaining to data storage media and data storage systems, are comprised within the present disclosure.

What is claimed is:

1. A device comprising:
   a magnetic write pole;
   a magnetic opposing pole longitudinally displaced from the magnetic write pole; and
   a thermal-source component disposed proximate to the magnetic write pole and comprising a thermal-source peg with a concave trailing edge that faces the magnetic write pole such that a center of the concave trailing edge is longitudinally displaced away from the write pole relative to sides of the concave trailing edge.

2. The device of claim 1, wherein the thermal-source peg is configured to emit electromagnetic radiation.

3. The device of claim 1, wherein the thermal source peg forms at least part of a near field transducer.

4. The device of claim 3, further comprising a solid immersion mirror, wherein the near field transducer is disposed adjacent to the solid immersion mirror.

5. The device of claim 3, further comprising a solid immersion lens, wherein the near field transducer is disposed adjacent to the solid immersion lens.

6. The device of claim 1 wherein the thermal-source peg further comprises a straight leading edge opposite the concave trailing edge.

7. The device of claim 1 wherein the thermal-source peg is a made of a solid material.

8. The device of claim 7, wherein the thermal-source peg is composed at least partly of one or more of gold, silver, copper, or aluminum.

9. The device of claim 1, wherein the magnetic write pole provides a saturation magnetization of greater than 1.6 tesla.

10. The device of claim 1 wherein the thermal-source peg produces a straight and narrow transition curvature for a thermal spot.

11. A device comprising:
    a magnetic write pole having a magnetic pole tip with an ellipsoidal pole tip face oriented in a forward longitudinal direction;
    a magnetic opposing pole disposed at a forward longitudinal displacement from the magnetic write pole; and
    a near field transducer disposed proximate to the magnetic write pole, comprising a near field transducer peg disposed proximate to the pole tip, wherein the near field transducer peg is elongated along a lateral dimension orthogonal to the longitudinal dimension and has an interior constructed from material.

12. The device of claim 11, wherein the near field transducer peg comprises a concave surface proximate to and facing the magnetic pole tip.

13. The device of claim 11 wherein a center of the concave surface is disposed at a forward longitudinal displacement relative to sides of the concave surface.

14. The device of claim 11, wherein the near field transducer peg comprises a flat surface proximate to and facing the magnetic pole tip.

15. The device of claim 11, wherein the near field transducer peg comprises dual distal nanorods proximate to and facing the magnetic pole tip, wherein the nanorods define a gap between them proximate to the magnetic pole tip.

16. The device of claim 11, wherein the transducer peg is composed at least partly of one or more of gold, silver, copper, or aluminum.

17. The device of claim 11 wherein the transducer peg produces a relatively straight and narrow curvature for a thermal spot.

18. The device of claim 11, wherein the near field transducer is disposed proximate to a solid immersion mirror comprising one or more of silicon, titanium, oxide, nitride, or sulfide.

19. A process comprising:
    positioning a magnetic recording head proximate to and in motion relative to a magnetic recording medium, wherein the direction of the relative motion of the magnetic recording head defines a down-track direction;
    emitting optical energy from an optical source comprising a solid thermal source peg on the magnetic recording head onto the magnetic recording medium with an isothermal footprint that has a greater length in a cross-track direction than in the down-track direction, thereby temporarily reducing the magnetic coercivity of a heated portion of the magnetic recording medium; and
    generating a magnetic field between a convex magnetic write pole positioned proximate to the optical source on the magnetic recording head, and a magnetic opposing pole disposed on the magnetic recording head, wherein the magnetic field passes through the heated portion of the magnetic recording medium.

20. The process of claim 19, further comprising emitting the optical energy using a means for providing that an isothermal profile of the heated portion has a trailing edge, relative to the motion of the magnetic recording head, that is relatively straight, relative to a remaining portion of the isothermal profile.

* * * * *